United States Patent
Wang et al.

(10) Patent No.: US 8,230,002 B2
(45) Date of Patent: Jul. 24, 2012

(54) METHOD AND SYSTEM FOR AUTOMATIC SETUP IN WEB-BASED APPLICATIONS

(75) Inventors: Joseph Wang, Beijing (CN); Kevin Walsh, Redwood Shores, CA (US); Sero Pascal, Beijing (CN); Xiruo Wang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 1346 days.

(21) Appl. No.: 11/655,717

(22) Filed: Jan. 18, 2007

(65) Prior Publication Data

US 2008/0177824 A1    Jul. 24, 2008

(51) Int. Cl.
*G06F 15/16* (2006.01)
(52) U.S. Cl. .................................................. 709/203
(58) Field of Classification Search .................... 709/203
See application file for complete search history.

(56) References Cited

U.S. PATENT DOCUMENTS

| | | | |
|---|---|---|---|
| 2002/0107967 A1* | 8/2002 | Klein et al. | 709/227 |
| 2004/0268303 A1* | 12/2004 | Abe et al. | 717/108 |

* cited by examiner

*Primary Examiner* — Hussein Elchanti
*Assistant Examiner* — Maceeh Anwari
(74) *Attorney, Agent, or Firm* — Hickman Palermo Truong Becker Bingham Wong LLP

(57) ABSTRACT

A method and system for automatic setup in web-based applications is provided. A plurality of HTTP requests and a plurality of responses between a client and a server are captured. The plurality of HTTP requests and responses are matched in a special order to extract one or more meaningful actions. One or more meaningful actions are recorded in time sequence. And the recorded meaningful actions are replayed when automatically setting up in web-based applications.

33 Claims, 6 Drawing Sheets

METHOD AND SYSTEM FOR AUTOMATIC SETUP IN WEB-BASED APPLICATIONS

FIELD OF THE PRESENT INVENTION

The present invention generally relates to setup in web-based applications, in particular, to a method and system for automatic setup in web-based applications.

BACKGROUND OF THE PRESENT INVENTION

Ever since web was introduced into the computer network, more and more applications are developed in this form. Generally, after a web-based application is deployed and before it runs on line, a user must manually setup the application by processing specific flows or feeding necessary data into it. This may involve a number of complex operations. For many huge applications, even a single module may include thousands of such setup steps and need to be processed precisely. Moreover, many instances that need to be configured are deployed with the same application but in different computers. Apparently, the complexity and the workload of the tasks may ultimately lead to users' frustration because manually doing this is boring, time costing and easily failures causing.

The limitations and disadvantages of conventional and traditional approaches will become apparent workarounds because none of them really focus on automatic setup but on functional testing or performance testing.

The solutions on the purpose of functional testing usually record user's actions within the web browser and then trigger these actions with parameterized data within the browser during playback. In this way, this method could be a workaround to feed data into web application, but apparently, it has great dependency on graphic user interface (GUI) environment or even web browsers and moreover, performance is always a significant issue.

The solutions on the purpose of performance testing record the HTTP(s) request data on the protocol level and post the data to the server to execute playback. As workarounds to implement automatic setup, this kind of solutions modifies the recorded data with the data that user wants to set up with. But the issue they are now facing is that many web applications are using dynamic unique data to identify sessions or transactions in the application level aside from the protocol level. During a whole session or transaction, the dynamic data encapsulated in HTML pages and HTTP(s) requests alternates between the server and the client, wherein the dynamic data of the client should be consistent with that of the sever. Since the dynamic data recorded last time during recording is definitely invalid for the next time, solutions have to use some additional specific dynamic data synchronization mechanism for a specific application to replace the dynamic data because different web applications have different ways to generate and encapsulate dynamic data in HTML pages. It is always desirable to have a system with a universal method to implement automatic setup in any web-based applications.

SUMMARY OF THE PRESENT INVENTION

The present invention provides a method and a system for automatic setup in web-based application.

According to one aspect of the present invention, there is provided a method for automatic setup in web-based application. The method comprises steps of: capturing a plurality of HTTP(s) requests and a plurality of responses between a client and a server; matching the plurality of HTTP(s) requests and the plurality of responses in a special order to extract at least one of meaningful actions; recording the at least one of meaningful actions in time sequence; and replaying the recorded at least one of meaningful actions. Wherein, the special order is time sequence. And the at least one of meaningful actions is any sort of actions that user may perform HTTP(s) methods on the HTTP(s) resource identified by the requested URI with or without data. And the at least one of meaningful actions comprises HTML element identifier. Moreover, the at least one of meaningful actions further comprises a document identifier or a parameter name list or both.

Step of matching the plurality of HTTP(s) requests and responses in a special order to extract the at least one of meaningful actions further comprises steps of: step 201, retrieving the first request from the plurality of HTTP(s) requests and set it to be a current request; step 202, retrieving the corresponding response for the current request from the plurality of HTTP(s) requests and responses; step 203, retrieving at least one of documents within the corresponding response or referred by the corresponding response from the plurality of HTTP(s) requests and responses; step 204, retrieving at least one of potential actions in the at least one of documents; step 205, retrieving next request from the plurality of HTTP(s) requests and responses; step 206, abstracting the at least one of meaningful actions from the at least one of potential actions based on the next request; step 207, setting the next request to be the current request, step 208, repeating step 202 to step 207, until there doesn't exist any response corresponding to the current request.

Step 202 further comprises steps of: step 301, determining whether there exists corresponding response for the current request; step 302, if it is determined that there exists corresponding response, determining whether the corresponding response is an instruction; step 303, if it is determined that the corresponding response is an instruction, retrieving a corresponding request and setting the corresponding request to be the current request; and step 304, repeating step 301 to step 303 until the corresponding response is not an instruction.

Wherein, the next request is the earliest request among all of the requests of the plurality of HTTP requests that have not been retrieved. And the at least one of potential actions are the meaningful actions within documents from which the meaningful actions will be matched out.

Step of replaying the recorded at least one of meaningful actions further comprises steps of: step 401, converting a tipping URL to a request and set the request to be a current request; step 402, retrieving a response for the current request from the server; step 403, retrieving the at least one of documents for the current dealing response; step 404, retrieving the next meaningful action from the recorded at least one of meaningful actions; step 405, retrieving an action in the at least one of documents based on the next meaningful action; step 406, converting the action to a corresponding request and setting the corresponding request to be the current request; step 407, determining if the action needs to be input new data by a user, if it is determined that the action needs to be input new data by a user, then replacing the original data for the action with the new data by the user, otherwise, proceeding to the next step; and step 408, repeating step 402 to step 407 until all the recorded at least one of meaningful actions are processed.

Wherein, step 402 further comprises steps of: step 501, determining whether there exists the response for said current request; step 502, if it is determined that there exists the response, determining whether the response is an instruction; step 503, if it is determined that the corresponding response is an instruction, generating a corresponding request and setting the corresponding response to be the current dealing response; and step 504, repeating step 501 to step 503 until the current dealing response is not an instruction.

Wherein, the new data is identified by a parameter name in the current request. The parameter name is in parameter list included in the meaningful actions.

Wherein, a next meaningful action is a first meaningful action among all of the meaningful actions that have not been processed. And the tipping URL is a URL address that replaying starts at. And the at least one of potential actions is one of meaningful actions within documents from which meaningful actions will be matched out.

According to another aspect of the present invention, there is provided a system for automatically setting up in web-based applications. The system comprises means for capturing a plurality of HTTP(s) requests and responses between a client and a server; means for matching the plurality of HTTP(s) requests and responses in a special order to extract at least one of meaningful actions; means for recording the at least one of meaningful actions in time sequence; and means for replaying the recorded at least one of meaningful actions.

According to another aspect of the present invention, there is provided a computer-readable medium. The computer-readable medium carries at least one of sequences of instructions which, when executed by at least one of processors, causes the at least one of processors to perform the method for automatic setup in web-based application.

According to an embodiment of the present invention, each first time when a user sets up a web application, all the setup actions will be recorded by the system. Next time if the user wants to set up the same web application with different configuration data, all the actions could be reactive and the new data could be fed into the application through the prior recorded actions. It is to be understood that the method and the system for web application automatic setup or configuration allows a user to efficiently setup and configure a web application. And it is very useful to improve the industry software implementation processes such as an ERP system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PRESENT INVENTION

A method and system for automatic setup in web-based applications is described in the following description. For the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
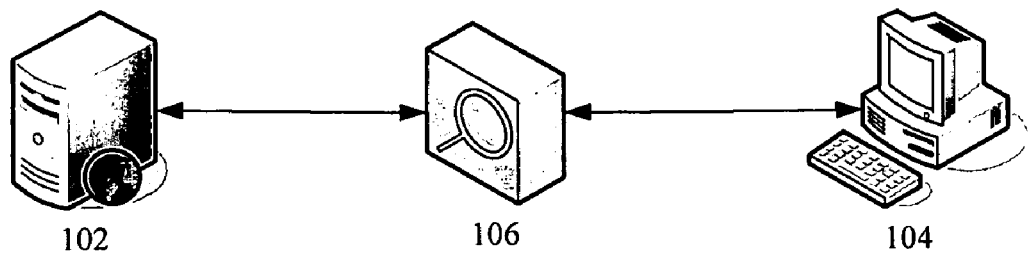
FIG. 1 is a diagram illustrating the infrastructure for recording the operations that the client executes to setup the server according to an embodiment of the present invention.

FIG. 1 is diagram illustrating the infrastructure for recording the operations that the client executes to setup the server according to an embodiment of the present invention. As shown in FIG. 1, computer 102 and 104 may be any types of computer systems, in an embodiment of the present invention, computer 104 is a client and computer 102 is a server, such as an application server operating a web application on behalf of and in cooperation with one or more clients. Specifically, client 104 submits to server 102 requests for data. Server 102 responds to client 104 to alter the appearance or contents of a component of a user interface displayed on the client mostly pages in HTML.

In the embodiment of the present invention a web application needs to be set up properly first for a specific service purpose before it starts to serve the client 104. These setup processes include executing specific functionalities with or without user input data by visiting specific URL address providing specific data in specific order. For example, a web application services as an ERP system for companies A, B, and C respectively. Apparently, companies A, B, and C should be set in the application by posting the data of the company's names to specific address. Thus, an embodiment of the present invention may be applied to record these operations for configuration and then replay them along with specific data to automatically setup application by triggering specific functionalities, in particular, feeding necessary data into the application.

As shown in FIG. 1, bridge-blocking 106 in the communication way between server 102 and client 104 captures all the communication data that alternates between them. It should be understood that bridge-blocking 106 could be a proxy, sniffer program etc., running in the client or the server side, or a networking device such as a router or a fire wire etc. And it has the capacity to record down the communication data, particularly the HTTP(s) requests and the responses for further analysis to extract meaningful actions.

Figure 2:
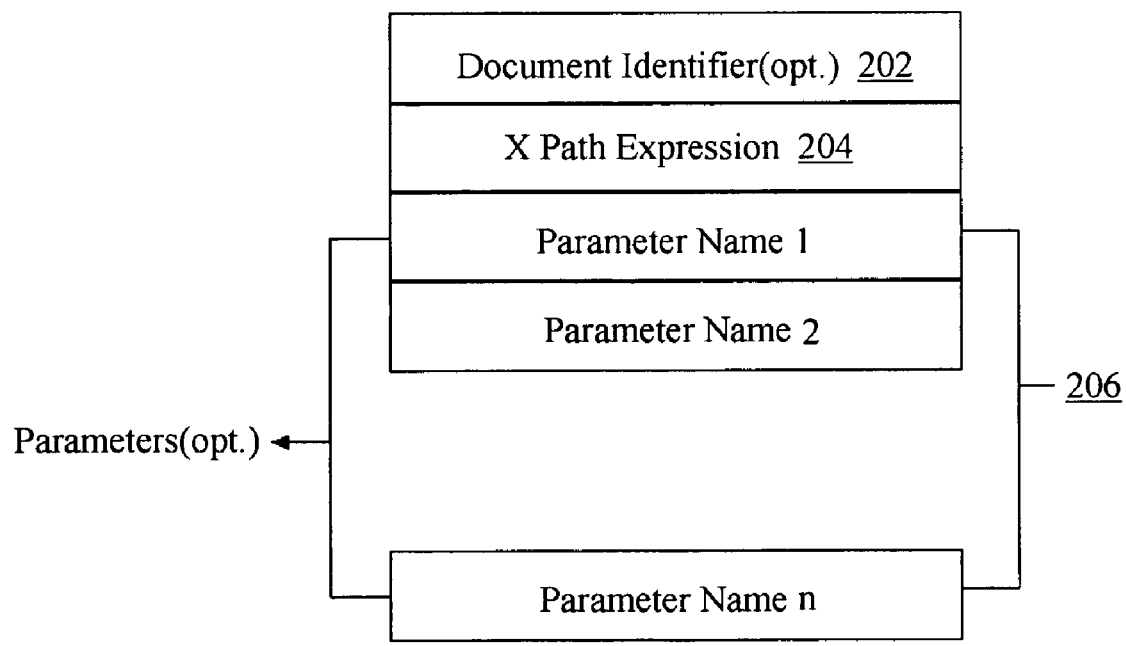
FIG. 2 is a diagram illustrating a format of the meaningful action according to an embodiment of the present invention.

Herein, the meaningful actions comprise any sort of actions that user may perform HTTP methods (for example, get, post, or head for HTTP 1.0) on the HTTP(s) resource identified by the requested URI with or without data. FIG. 2 is a diagram illustrating a format of the meaningful action according to an embodiment of the present invention. The meaningful action shown in FIG. 2 comprises a document identifier 202, an Xpath expression 204, and a parameter name list 206. The document identifier 202 and the parameter name list 206 are optional.

The document identifier 202 represents the HTML documents that the server 102 responds for one request. Most of the time, server 102 responds one HTML page for one request and in many cases; the response page includes other references to other HTML documents that the browser is supposed to retrieve. In this case, the document identifier 202 represents these HTML documents that the HTML tags will be further retrieved in.

The Xpath expression 204 is used to uniquely identify the HTML elements, which may cause the execution of HTTP methods (such as get, post, or head for HTTP 1.0) such as HTML element "A", "AREA", "Form" etc. in HTML document.

The parameter list 206 comprises the parameterized parameter names that the system uses to label user input data. The request info submitted from client 104 to server 102 may consist of many parameters in URL address or in HTTP(s) entity data rested up HTTP(s) methods. Wherever they are, only renderable parameters are supposed to be listed in the parameter list 206.

Now, one embodiment of the present invention will be described in detail with reference to FIG. 1 to FIG. 6.

Figure 3:
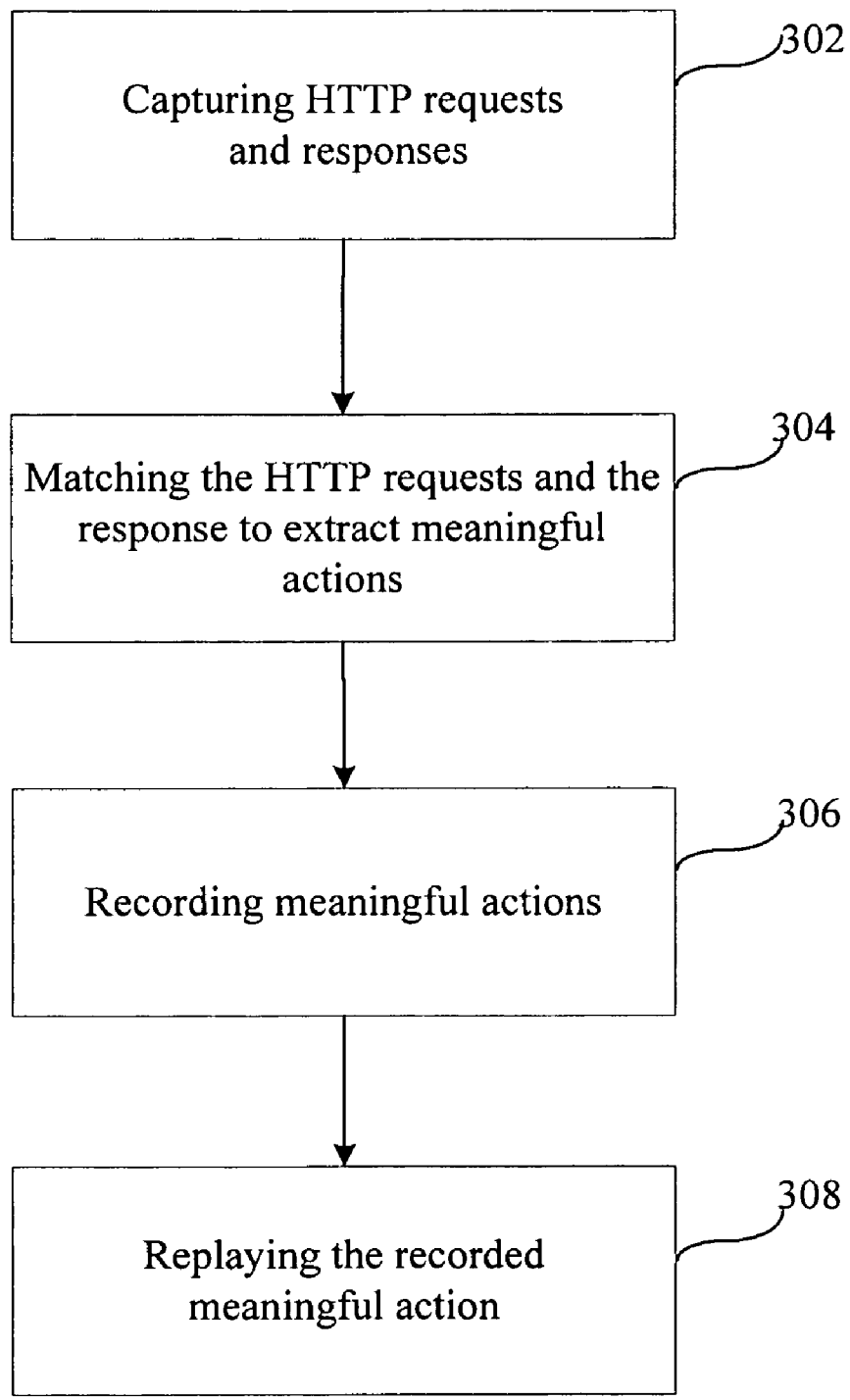
FIG. 3 is a flow chart illustrating steps of automatic setup in web-based applications according to the present invention.

FIG. 3 is a flow chart illustrating steps of automatic setup in web-based applications according to the present invention. As shown in FIG. 3, it sarts from the step 302 for capturing a plurality of HTTP(s) requests and responses between client 104 and server 102, as shown in FIG. 1. Then, the plurality of requests and responses is matched and analyzed in a special order to extract one or more meaningful actions in step 304. Next, the extracted meaningful actions are recorded in time sequence in step 306. Finally, the recorded meaningful actions are replayed when executing automatic setup in web-based applications in step 308.

Figure 4:
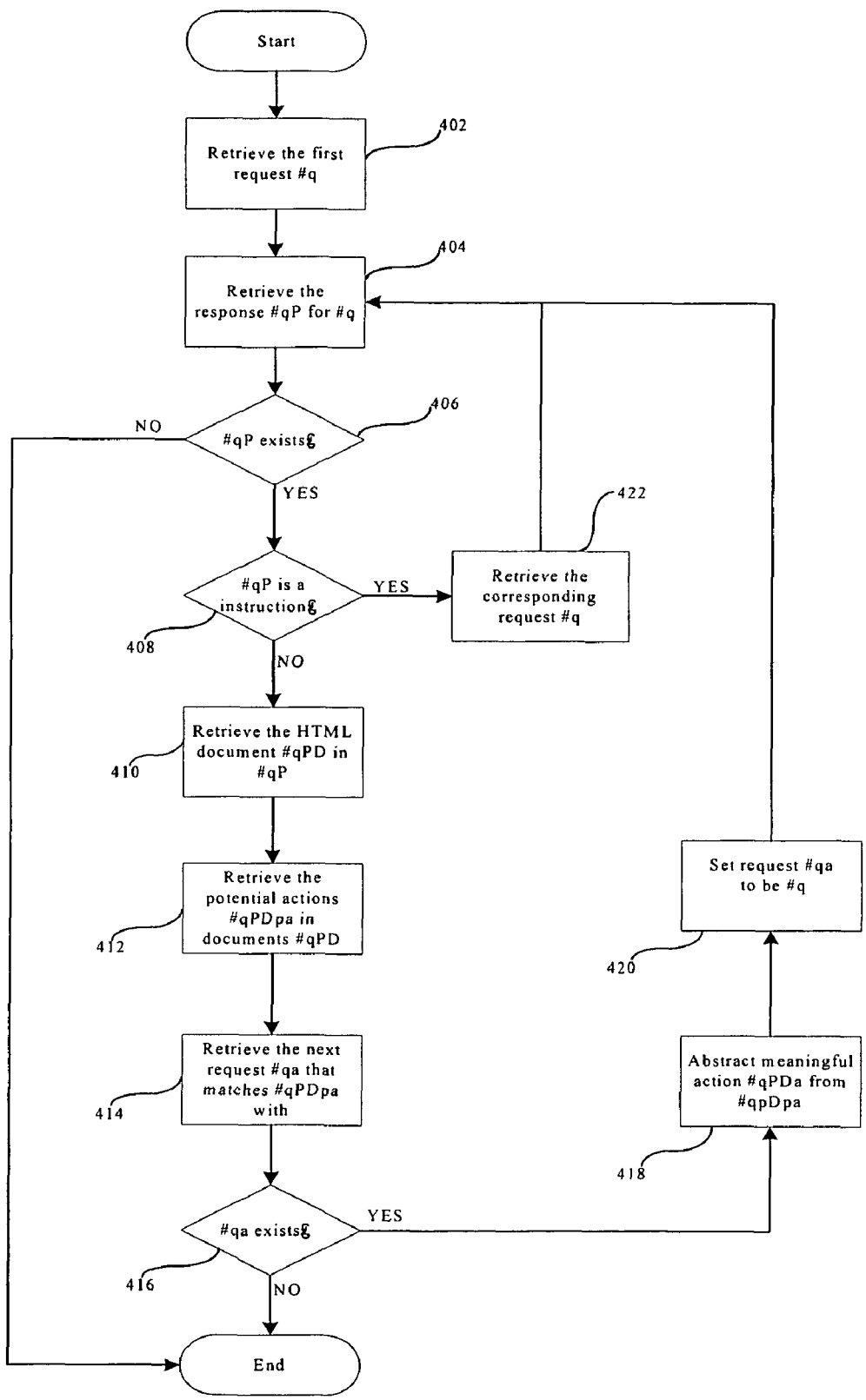
FIG. 4 is a flow chart illustrating steps of abstracting and recording meaningful actions from a plurality of HTTP(s) requests and responses according to one embodiment of the present invention.

FIG. 4 is a flow chart illustrating steps of abstracting and recording meaningful actions from a plurality of HTTP(s) requests and responses according to one embodiment of the present invention.

Initially, in step 402, the next request #q is retrieved from a plurality of HTTP(s) requests and responses, to set it to be a current request then. It should be noted herein that the next request #q is the earliest request among all of the requests that have not been retrieved. Therefore, at the first time, the next request is actually the first request which is submitted to server 102 by client 104. Then, in step 404, the response #qP is retrieved for the current request #q, which is responded by server 104 from the entire recorded requests and responses.

Next, in step 406, a determination is made as to whether a response #qP corresponds to the current request #q. If the determination of step 406 is negative, then processing ends. If the determination of step 406 is positive, processing goes to step 408.

Here, it should be noted that the response #qP may have HTTP(s) instructions or be integral response having HTML documents. And the HTML documents may have some references to other HTML documents. For example, the frame references in a HTML document may cause other requests to request those documents that the reference indicates. Therefore, a determination is made as to whether the response #qP is an instruction in step 408. If the determination of step 408 is negative, one or more HTML documents #qPD in or referred by the response #qP of the current request #q are directly retrieved from the plurality of HTTP(s) requests and responses in step 410. If there are document references within the retrieved document, this step may recursively involve corresponding request and response retrieving from the plurality of HTTP(s) requests and responses. If the determination of step 408 is positive, that is, the response #qP is an instruction, the corresponding request for the response #qP is retrieved from the captured HTTP requests and responses and it is set to be the current request #q. Then, processing proceeds to step 404, and steps 404, 406, 408, and 422 are repeated until the response #qP is not an instruction.

The HTML document #qPD may have many HTML elements that cause actions which may be executed by a user. For example, element <A> having hyperlink address may link to the addressed page and the element <Form> having action address may submit data to the addressed destination. These elements are regarded as potential actions #qPDpa from which the meaningful action comes. Therefore, in step 412, the potential actions #qPDpa is retrieved in the documents #qPD.

If user activates one of these potential actions #qPDpa, there should be a request #qa caused by the activated action and this request #qa could be sought out. Therefore, in step 414, the next request #qa matching with the potential action #qPDpa is retrieved.

Next, in step 416, a determination is made as to whether there exists the next request #qa. If the determination is negative, then processing ends. And if the next request #qa exists, in step 418, the potential action that matches this request is abstracted as a meaningful action #qPDa. In this step, the document #qPD which is identified by the document identifier 202 and includes elements is extracted and recorded down. The elements identified by the unique XPath expression 204 is extracted and recorded down. All the names of renderable input elements in <Form> (in browsers, renderable input elements are supposed to be seen and can be input or selected data by a user, for example a <Select> element or an <Input> element whose type is not hidden) are extracted and recorded down to form parameter name list 206.

After the meaningful action #qPDa is abstracted, the request #qa is set to be the next request #q in step 420. Then, processing goes to step 404 and the steps mentioned above are repeated until all the meaningful actions are abstracted. This process for abstracting meaningful actions could happen either after recording of all the requests and responses have been finished or instantaneously during the recording process.

Figure 5:
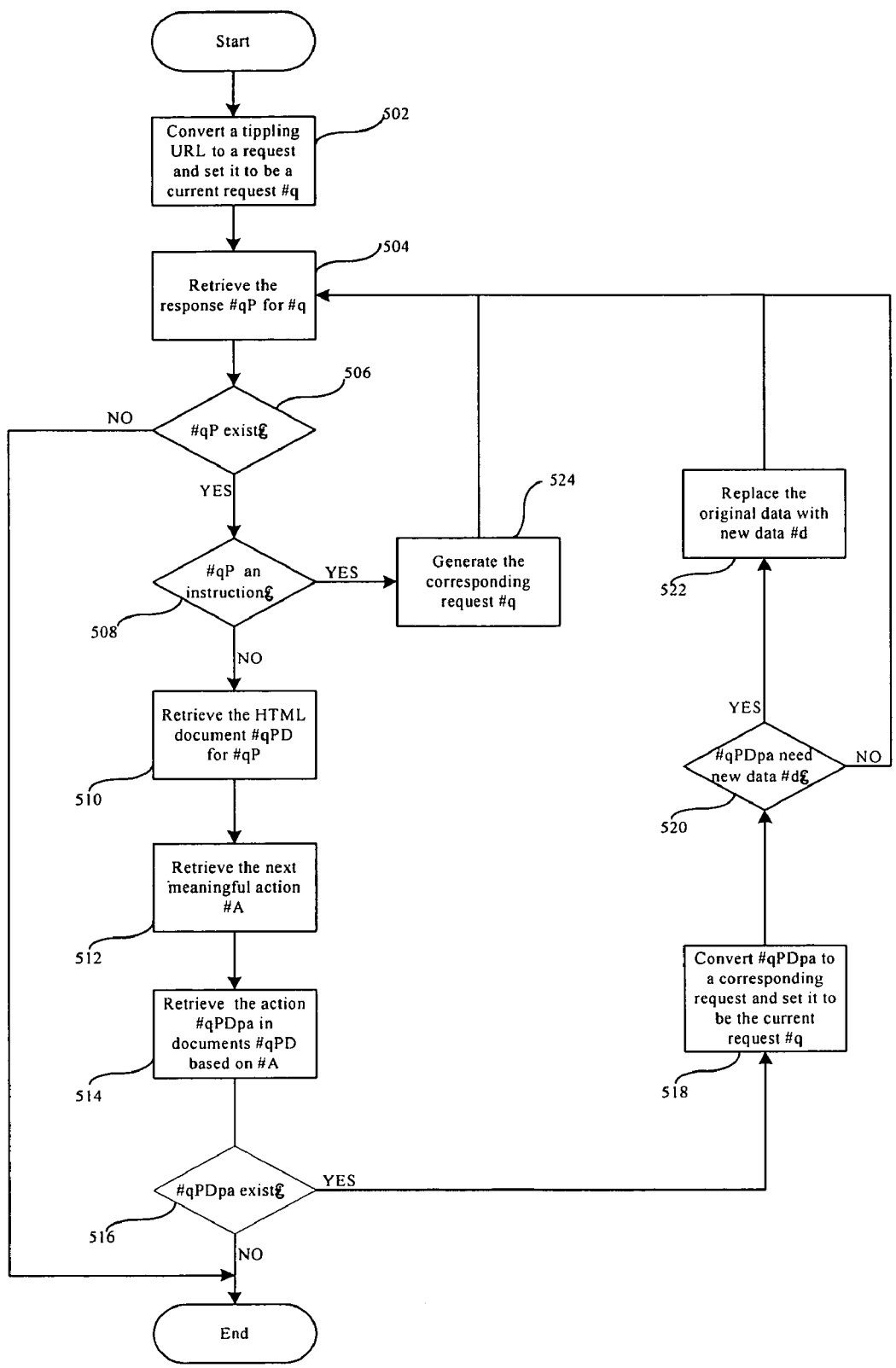
FIG. 5 is a flow chart illustrating steps of replaying the meaningful actions according to an embodiment of the present invention.

FIG. 5 is a flow chart illustrating steps of replaying the meaningful actions to perform automatic setup according to an embodiment of the present invention. As shown in FIG. 5, when the playback procedure begins, it starts with a URL address that replaying starts at. And in step 502, the URL address is converted into a request and the request is set as the current request #q. Then in step 504, a response #qP for the current request #q is retrieved from the server 102. A determination is made as to where there exists the response #qP in step 506. If the determination is negative, which probably means the playback process has been finished at this point or the communication is broken down, the processing ends. Otherwise, processing goes to step 508.

The response #qP may have HTTP(s) instructions or be integral response having HTML documents. And the HTML documents may have some references to other HTML documents. For example, the frame references in a HTML document may cause other requests to request those documents that the reference indicates. Therefore, a determination is made as to whether the response #qP is an instruction in step 508. If the determination is negative, one or more HTML documents #qPD in or referred by the response #qP is directly retrieved for the current request #q in step 510. If there are document references within the retrieved document, this step may recursively involve corresponding request generating and response retrieving from the server 102. And if the determination of step 508 is positive, that is, the response #qP is an instruction, a corresponding request is generated for the response #qP and the corresponding request is set to be the current request #q. Then, processing proceeds to step 504. Thus, all the referencing documents along with the parent document is retrieved so as to retrieve HTML document #qPD by repeating steps 504, 506, 508, and 524.

Next, the next meaningful action #A is retrieved from the recorded one or more meaningful actions in step 510. In step 514, according to the document identifier 202 if any, and the XPath expression 204 of the next meaningful action #A, an action #qPDpa then can be retrieved within the HTML documents #qPD.

A determination is made as to whether there exists the action #qPDpa in step 516. If the determination is negative, processing ends. But if the action #qPDpa exists, processing goes to step 518. In this step, the action #qPDpa is converted to a HTTP(s) request and this request is set to be the current request #q beside the common conversion required, such as the conversion of URL address or the generation of the header data to maintain the HTTP(s) session etc.

The address of the current request #p would be the subject of the potential action #qPDpa. For example, if the action #qPDpa is a HTML element <A>, the address would be converted from the "href" attribute of the retrieved element, and if the action #qPDpa is a HTML element <Form>, the address would be converted from the "action" attribute of this element etc. All of these attributes are retrieved from the HTML documents #qPD or the document identifier specified within the HTML documents #qPD.

The action #qPDpa could be an action which is supposed to submit some data to the web application. Therefore, a determination is made as to whether the action #qPDpa needs to be input new data #d by a user in step 520. If the determination is positive, the original data for the action #qPDpa is replaced with the new data #d within the generated request. #q according to the parameter name in step 522 and then processing goes to step 504. Herein, the parameter name list 206 is used to verify and map the input new data #d with the renderable input elements. If the determination is negative, processing proceeds to step 504 and steps mentioned above are repeated until all the recorded meaningful actions are processed.

Figure 6:
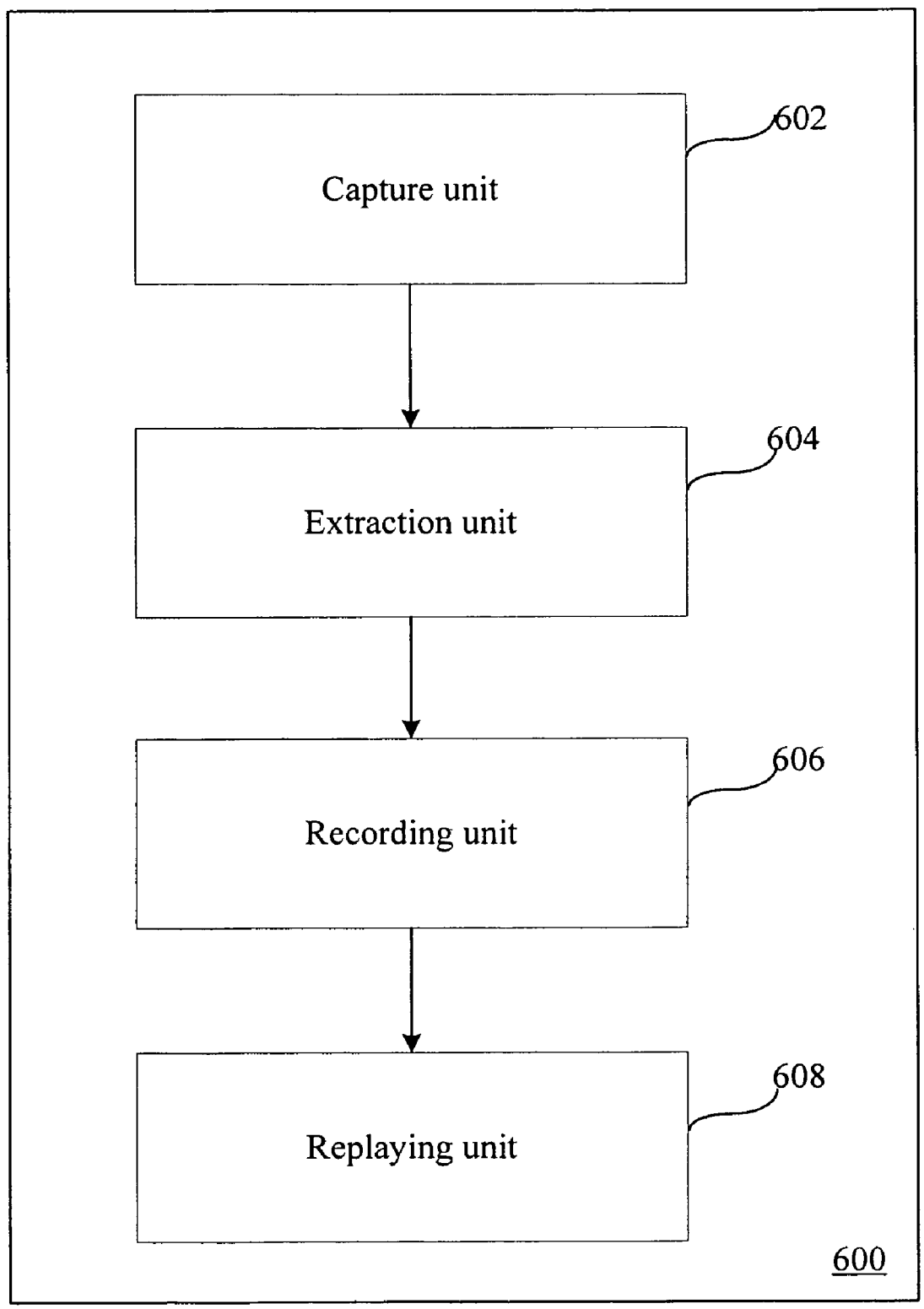
FIG. 6 is a block diagram of a system for automatic setup in web-based applications according to the present invention.

FIG. 6 is a block diagram of a system for automatic setup in web-based applications according to the present invention. As shown in FIG. 6, a system 600 for automatic setup in web-based applications comprises capture unit 602 for capturing a plurality of HTTP(s) requests and responses between server 102 and client 104; extraction unit 604 for matching and analyzing the plurality of HTTP(s) requests and responses from capture unite 602 in a special order to extract one or more meaningful actions; recording unit 606, coupled to extraction unit 604, for recording the one or more meaningful actions in time sequence; and replaying unit 608, in response to the output from recording unit 606, for replaying the recorded meaningful actions. In capture unit 602, a plurality of HTTP(s) requests and responses between server 102 and client 104 are captured. Then, in extraction unit 604, the first request is retrieved from the plurality of HTTP(s) requests and responses and is set to be a current request; the corresponding response for the current request from the plurality of HTTP(s) requests and responses is retrieved; one or more documents within the corresponding response or referred by the corresponding response from the plurality of HTTP(s) requests and responses is retrieved; one or more potential actions in the one or more documents are retrieved; next request from the plurality of HTTP(s) requests and responses is retrieved; a meaningful action from the one or more potential actions based on the next request is abstracted; and the next request is set to be the current request, then the above steps are repeated until there doesn't exist any response corresponding to the current request. Recording unit 606 records all extracted meaningful actions in time sequence. Replaying unit 608 begins to replay the recorded meaningful actions recorded by the recording unit 606 when getting a tipping URL. In replaying unit 608, the tipping URL is converted to a request, and the request is set to be a current request. Then, replaying unit 608 repeats the following steps until all the recorded one or more meaningful actions are processed: a response for the current request is retrieved from server 102; if it is determined that there exists the response, the response is set to be the current dealing response and one or more documents for the current dealing response are retrieved; the next meaningful action is retrieved from the recorded one or more meaningful actions; an action in the one or more documents is retrieved based on the next meaningful action; the action is converted to a corresponding request and the corresponding request is set to be the current request; and a determination is made as to whether the action needs to be input new data by a user.

Figure 7:
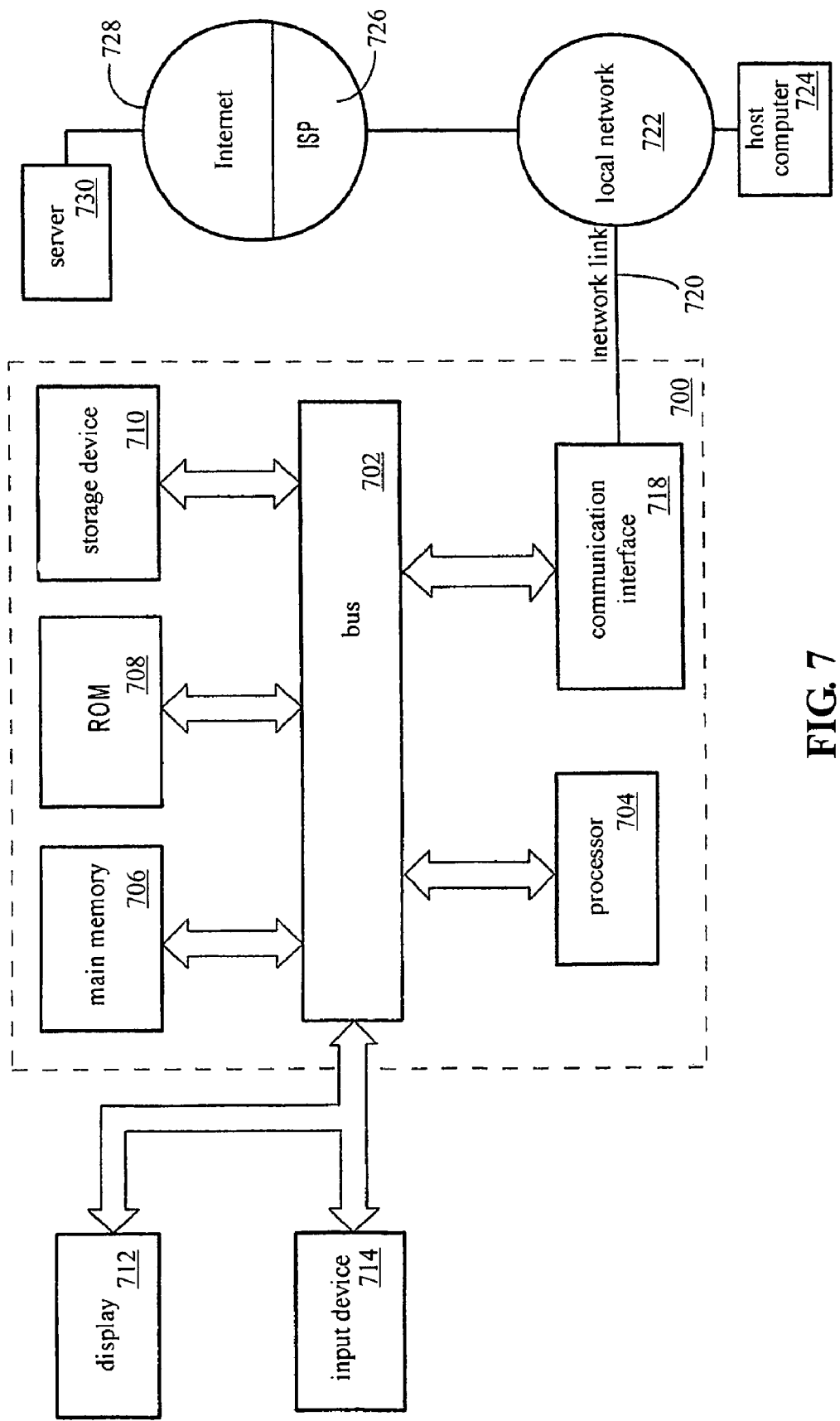
FIG. 7 is a block diagram of a computer system upon which embodiments of the present invention are implemented.

FIG. 7 is a block diagram that illustrates a computer system 700 upon which an embodiment of the present invention is implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions. In the embodiment of the present invention, information and instructions include customer information, relationship types, transaction history and setup data.

Computer system 700 may be coupled via bus 702 to a display 712, such as a cathode ray tube (CRT) or LCD, for displaying information to a computer user. An input device 714, including alphanumeric and other keys, is coupled to bus 702 for communicating information and command selections to processor 704. In the embodiment of the present invention, the customer and relationship types are input through input device 714.

The present invention is related to the use of computer system 700 for implementing the techniques described herein. According to one embodiment of the present invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the present invention. Thus, embodiments of the present invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the present invention have been described with reference to numerous specific details that may vary from implementation to implementation. Thus, the sole and exclusive indicator of what is the present invention, and is intended by the applicants to be the present invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising steps of:
during a first set-up operation for a web-based application, capturing a plurality of HTTP(s) requests and a plurality of responses between a client and a server;
retrieving a document within a response of the plurality of responses or referred to by the response;
wherein the document comprises one or more elements that correspond to one or more potential actions;
wherein each element of the one or more elements is configured to cause execution of a corresponding potential action of the one or more potential actions;
determining whether the plurality of HTTP(s) requests includes any request, subsequent to the response, that matches any potential action of the one or more potential actions;
responsive to determining that a request subsequent to the response matches a potential action of the one or more potential actions, abstracting the potential action as a meaningful action;
recording action data that represents a plurality of meaningful actions, including the meaningful action abstracted from the potential action, in a time sequence; and
during a second set-up operation for the web-based application, using said recorded action data to replay the plurality of meaningful actions in said time sequence;
wherein the method is performed by at least one device comprising a processor.

2. The method of claim 1, further comprising steps of:
(a) retrieving a first request from the plurality of HTTP(s) requests and setting the retrieved first request to be a current request;
(b) retrieving a corresponding response to the current request from the plurality of HTTP(s) requests and responses;
(c) retrieving one or more documents within the corresponding response or referred by the corresponding response from the plurality of HTTP(s) requests and responses;
(d) retrieving at least one element in the one or more documents;
(e) retrieving a next request from the plurality of HTTP(s) requests and responses;
(f) abstracting one or more meaningful actions from at least one potential action caused by the at least one element based on the next request;
(g) setting the next request to be the current request; and
(h) repeating steps (b) to (g), until there does not exist any response corresponding to the current request.

3. The method of claim 2, wherein, step (b) further comprises steps of:

(b1) determining whether there exists corresponding response for the current request;

(b2) if it is determined that there exists the corresponding response, determining whether the corresponding response is an instruction;

(b3) if it is determined that the corresponding response is an instruction, retrieving a corresponding request and setting the corresponding request to be the current request; and (b4) repeating steps (b1) to (b3) until the corresponding response is not an instruction.

4. The method of claim 2, wherein, the one or more potential actions are the one or more meaningful actions within documents from which the meaningful actions are matched with.

5. The method of claim 2, wherein, the next request is the earliest request among all of the requests of the plurality of HTTP requests that have not been retrieved.

6. The method of claim 1, wherein, step of using said recorded action data to replay the plurality of meaningful actions in said time sequence further comprises steps of:

(c1) converting a tipping URL to a request and setting the request to be a current request;

(c2) retrieving a response to the current request from the server;

(c3) retrieving one or more documents for the current dealing response;

(c4) retrieving a next meaningful action from the recorded one or more meaningful actions;

(c5) retrieving an action in the one or more documents based on the next meaningful action;

(c6) converting the retrieved action to a corresponding request and setting the corresponding request to be the current request;

(c7) determining if the retrieved action needs to be input new data by a user, if the determination becomes positive, replacing the original data for the retrieved action with new data, otherwise, proceeding to the next step; and (c8) repeating steps (c2) to (c7) until all the recorded one or more meaningful actions are processed.

7. The method of claim 6, wherein, step (c2) further comprises steps of:

(d1) determining whether there exists the response for the current request;

(d2) if the determination is positive, determining whether the response is an instruction;

(d3) if it is determined that the corresponding response is an instruction, generating a corresponding request and setting the corresponding response to be the current dealing response; and (d4) repeating steps (d1) to (d3) until the current dealing response is not an instruction.

8. The method of claim 6, wherein, the new data is identified by a parameter name in the current request and the parameter name is in a parameter list that is included in the meaningful actions.

9. The method of claim 6, wherein, the next meaningful action is the first meaningful action among all of the meaningful actions that have not been processed.

10. The method of claim 6, wherein, the tipping URL is a URL address that replaying starts at.

11. The method of claim 1, wherein, the particular order is a time sequence.

12. The method of claim 1, wherein, the meaningful actions include actions that have been performed by using HTTP(s) methods on an HTTP(s) resource identified by a requested URI.

13. The method of claim 1, wherein, the meaningful actions comprise an HTML element identifier.

14. The method of claim 1, wherein, the meaningful actions further comprise one or more of (a) a document identifier and (b) a parameter name list.

15. The method of claim 1 wherein the step of recording action data that represents the plurality of meaningful actions in time sequence is performed without recording values of parameterized data included in said HTTP(s) requests and responses.

16. The method of claim 1 further comprising, during playback of the meaningful actions, receiving user input for one or more values required to perform said meaningful actions.

17. A system for automatically setting up in web-based applications, comprising:

one or more processors;

logic configured for:

capturing a plurality of HTTP requests and a plurality of responses between a client and a server;

retrieving a document within a response of the plurality of responses or referred to by the response;

wherein the document comprises one or more elements that correspond to one or more potential actions;

wherein each element of the one or more elements is configured to cause execution of a corresponding potential action of the one or more potential actions;

determining whether the plurality of HTTP(s) requests includes any request, subsequent to the response, that matches any potential action of the one or more potential actions;

responsive to determining that a request subsequent to the response matches a potential action of the one or more potential actions, abstracting the potential action as a meaningful action;

recording a plurality of meaningful actions, including the meaningful action abstracted from the potential action, in a time sequence; and replaying the plurality of meaningful actions.

18. A computer-readable non-transitory volatile or non-volatile storage medium storing one or more sequences of instructions which, when executed by one or more processors, cause:

during a first set-up operation for a web-based application, capturing a plurality of HTTP(s) requests and a plurality of responses between a client and a server;

retrieving a document within a response of the plurality of responses or referred to by the response;

wherein the document comprises one or more elements that correspond to one or more potential actions;

wherein each element of the one or more elements is configured to cause execution of a corresponding potential action of the one or more potential actions;

determining whether the plurality of HTTP(s) requests includes any request, subsequent to the response, that matches any potential action of the one or more potential actions;

responsive to determining that a request subsequent to the response matches a potential action of the one or more potential actions, abstracting the potential action as a meaningful action;

recording action data that represents a plurality of meaningful actions, including the meaningful action abstracted from the potential action, in a time sequence; and during a second set-up operation for the web-based application, using said recorded action data to replay the plurality of meaningful actions in said time sequence.

19. The computer-readable medium of claim 18, further storing one or more sequences of instructions which, when executed by the one or more processors, cause:
（a) retrieving a first request from the plurality of HTTP(s) requests and setting the retrieved first request to be a current request;
(b) retrieving a corresponding response to the current request from the plurality of HTTP(s) requests and responses;
(c) retrieving one or more documents within the corresponding response or referred by the corresponding response from the plurality of HTTP(s) requests and responses;
(d) retrieving at least one element in the one or more documents;
(e) retrieving a next request from the plurality of HTTP(s) requests and responses;
(f) abstracting one or more meaningful actions from at least one potential action caused by the at least one element based on the next request;
(g) setting the next request to be the current request; and
(h) repeating steps (b) to (g), until there does not exist any response corresponding to the current request.

20. The computer-readable medium of claim 19, wherein step (b) further comprises:
(b1) determining whether there exists corresponding response for the current request;
(b2) if it is determined that there exists the corresponding response, determining whether the corresponding response is an instruction;
(b3) if it is determined that the corresponding response is an instruction, retrieving a corresponding request and setting the corresponding request to be the current request; and
(b4) repeating steps (b1) to (b3) until the corresponding response is not an instruction.

21. The computer-readable medium of claim 19, wherein the one or more potential actions are the one or more meaningful actions within documents from which the meaningful actions are matched with.

22. The computer-readable medium of claim 19, wherein the next request is the earliest request among all of the requests of the plurality of HTTP requests that have not been retrieved.

23. The computer-readable medium of claim 18, wherein using said recorded action data to replay the plurality of meaningful actions in said time sequence further comprises:
(c1) converting a tipping URL to a request and setting the request to be a current request;
(c2) retrieving a response to the current request from the server;
(c3) retrieving one or more documents for the current dealing response;
(c4) retrieving a next meaningful action from the recorded one or more meaningful actions;
(c5) retrieving an action in the one or more documents based on the next meaningful action;
(c6) converting the retrieved action to a corresponding request and setting the corresponding request to be the current request;
(c7) determining if the retrieved action needs to be input new data by a user, if the determination becomes positive, replacing the original data for the retrieved action with new data, otherwise, proceeding to the next step;
(c8) repeating steps (c2) to (c7) until all the recorded one or more meaningful actions are processed.

24. The computer-readable medium of claim 23, wherein step (c2) further comprises:
(d1) determining whether there exists the response for the current request;
(d2) if the determination is positive, determining whether the response is an instruction;
(d3) if it is determined that the corresponding response is an instruction, generating a corresponding request and setting the corresponding response to be the current dealing response;
(d4) repeating steps (d1) to (d3) until the current dealing response is not an instruction.

25. The computer-readable medium of claim 23, wherein the new data is identified by a parameter name in the current request and the parameter name is in a parameter list that is included in the meaningful actions.

26. The computer-readable medium of claim 23, wherein the next meaningful action is the first meaningful action among all of the meaningful actions that have not been processed.

27. The computer-readable medium of claim 23, wherein the tipping URL is a URL address that replaying starts at.

28. The computer-readable medium of claim 18, wherein the particular order is a time sequence.

29. The computer-readable medium of claim 18, wherein the meaningful actions include actions that have been performed by using HTTP(s) methods on an HTTP(s) resource identified by a requested URI.

30. The computer-readable medium of claim 18, wherein the meaningful actions comprise an HTML element identifier.

31. The computer-readable medium of claim 18, wherein the meaningful actions further comprise one or more of (a) a document identifier and (b) a parameter name list.

32. The computer-readable medium of claim 18, wherein recording action data that represents the plurality of meaningful actions in time sequence is performed without recording values of parameterized data included in said HTTP(s) requests and responses.

33. The computer-readable medium of claim 18, further storing one or more sequences of instructions which, when executed by the one or more processors, cause:
during playback of the meaningful actions, receiving user input for one or more values required to perform said meaningful actions.

* * * * *

UNITED STATES PATENT AND TRADEMARK OFFICE
CERTIFICATE OF CORRECTION

PATENT NO.        : 8,230,002 B2
APPLICATION NO.   : 11/655717
DATED             : July 24, 2012
INVENTOR(S)       : Wang et al.

Page 1 of 1

It is certified that error appears in the above-identified patent and that said Letters Patent is hereby corrected as shown below:

In column 5, line 12, delete "sarts" and insert -- starts --, therefor.

In column 7, line 26, delete "request. #q" and insert -- request #q --, therefor.

Signed and Sealed this
Sixth Day of November, 2012

David J. Kappos
*Director of the United States Patent and Trademark Office*